United States Patent
Hollatz et al.

(12)

(10) Patent No.: US 6,625,259 B1
(45) Date of Patent: Sep. 23, 2003

(54) PACKET TELEPHONY GATEWAY FOR HEARING IMPAIRED RELAY SERVICES

(75) Inventors: Michael C. Hollatz, Huntley, IL (US); Paul D. Swardstrom, Naperville, IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 09/537,141

(22) Filed: Mar. 29, 2000

(51) Int. Cl.[7] ................................................. H04M 1/64
(52) U.S. Cl. ..................................... 379/88.17; 370/354
(58) Field of Search ........................... 379/88.17, 88.18, 379/88.14; 370/352, 354

(56) References Cited

U.S. PATENT DOCUMENTS

| | | | |
|---|---|---|---|
| 5,163,081 A | | 11/1992 | Wycherley et al. ........... 379/52 |
| 5,712,901 A | * | 1/1998 | Meermans .................... 379/88 |
| 5,905,476 A | * | 5/1999 | McLaughlin et al. .......... 345/1 |

* cited by examiner

*Primary Examiner*—Creighton Smith
(74) *Attorney, Agent, or Firm*—Welsh & Katz, Ltd.

(57) ABSTRACT

A method and apparatus are provided for relaying text between a hearing impaired person and a third party through the public switched telephone network. The method includes the steps of converting the text between a multifrequency textual format on the public switched telephone network and a packet format on a local area network and exchanging the text with the hearing impaired person through the local area network.

34 Claims, 2 Drawing Sheets

PACKET TELEPHONY GATEWAY FOR HEARING IMPAIRED RELAY SERVICES

FIELD OF THE INVENTION

The field of the invention relates to telephony and more particularly to communication devices for the hearing impaired.

BACKGROUND OF THE INVENTION

Telecommunication devices for hearing impaired people are generally known. Such devices are typically structured as computer terminals, which may be coupled electrically or acoustically to a telephone line.

Telecommunication devices for the hearing impaired are typically used in conjunction with relaying services that may be offered to the hearing impaired by a local public switched telephone network free of charge. Typically, an agent of the relaying service sits at a terminal and relays messages from a hearing impaired client to the non-hearing impaired.

For example, if the hearing impaired client were to want a pizza, he would couple his terminal to a telephone line and dial the relaying service. Upon detecting a connection with the agent, the hearing impaired client would type, "I want a pizza." The sentence "I want a pizza" would appear on the terminal of the agent. The agent, in turn, may type on his keyboard "Where do you want it ordered from?" The hearing impaired person may respond by typing the name and location of the source. In response, the agent may pick up his telephone and dial the designated pizza place and then act as a verbal intermediary in the process of ordering a pizza.

The relaying service typically provides two telephone lines for each agent. The first line connects a terminal of the agent with the terminal of the hearing impaired client through the public switched telephone network. The second telephone line may be used by the agent to contact third parties at the request of the client.

Communication between the terminal of the hearing impaired client and agent may occur under any of a number of different protocols (e.g., Baudot, ASCII, Turbocode, etc.). Further, upon getting a call from a client, an agent may not know a priori what type of protocol will be used. As a consequence, an agent may need to sequentially decode an incoming data stream using each possible protocol until he finds one that works for the calling client.

While existing methods of providing call relaying services for the hearing impaired works relatively well, the method is unnecessarily complex and expensive to operate. Each agent requires at least two telephone lines. Where a call relaying service has many agents, many telephone lines are required. Further, during slow periods many of the lines may remain idle. Because of the importance of helping the hearing impaired, a need exists for a more efficient method for relaying calls of the hearing impaired.

SUMMARY

A method and apparatus are provided for relaying text between a hearing impaired person and a third arty through the public switched telephone network. The method includes the steps of converting the text between a multifrequency textual format on the public switched telephone network and a packet format on a local area network and exchanging the text with the hearing impaired person through the local area network.

DETAILED DESCRIPTION OF A PREFERRED EMBODIMENT

Figure 1:
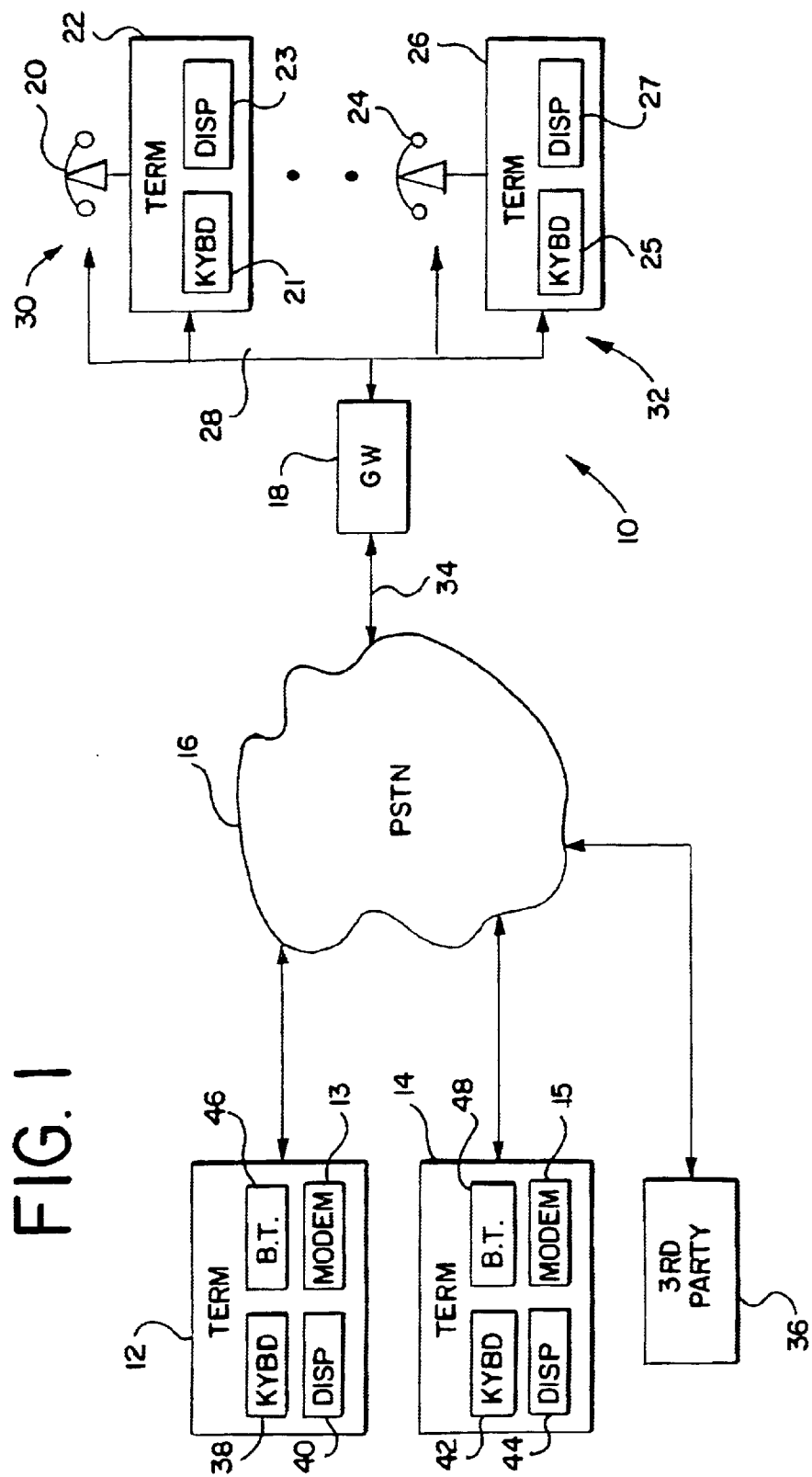
FIG. 1 depicts a system for relaying calls from hearing impaired persons in accordance with an illustrated embodiment of the invention.

FIG. 1 depicts apparatus 10 for relaying information of the hearing impaired, shown generally in accordance with an illustrated embodiment of the invention. As shown, a hearing impaired person, using a terminal 12, 14 may initiate a call to (or receive a call from) the relaying service 10 through the public switched telephone network (circuit switched PSTN) 16.

While connected to the circuit switched PSTN 16, the terminal 12, 14 may generally transceive text (i.e., alphanumeric characters) under any of a number of textual transmission formats (e.g., Baudot, ASCII or Turbocode). The text is converted into a binary sequence in a transcoder (BT) 46, 48 under one of the textual formats and processed through a modem 13, 15. Within the modem 13, 15 the binary sequence is converted into a number of predetermined frequency tones (or tone combinations). The result is a sequence of tones or tone combinations that may be referred to as a multifrequency textual signal. As used herein, a multifrequency textual signal means alphanumeric text encoded for transmission over a voice-channel using an appropriate binary encoding technique (e.g., Baudot, ASCII, Turbocode, etc.) and a modem operating under a multifrequency transmission format.

To use the terminal 12, 14, the hearing impaired person may enter text using a keyboard 38, 42. Text from the keyboard 38, 42 is transferred to the BT 46, 48 for encoding and transmission through the modem 13, 15 Similarly, a multifrequency textual signal from an agent 30, 32 may be received by the modem 13, 14, converted into a binary signal which may be decoded by the BE 46, 48 and displayed as textual information on a display 40, 44.

As the call is directed through the circuit switched PSTN 16, it is coupled to a gateway (GW) 18. From the GW 18, the call may be directed to an agent station 30, 32, as discussed in more detail below.

Each agent station 30, 32 may include a terminal 22, 26 and an associated packet telephone 20, 24 (e.g., made by Cisco, Lucent, Nortel, etc.). While FIG. 1 shows two agent stations 30, 32, it should be understood that the system 10 may include any number of agent stations 30, 32.

The terminal 22, 26 and packet telephone 20, 24 of each agent station 30, 32 are coupled to the gateway 18 through a local area network (i.e., a packet network) 28. The GW 18 may, in turn, be coupled to the circuit switched PSTN 16 through one or telephone connections (e.g., trunk groups) 34.

Figure 2:
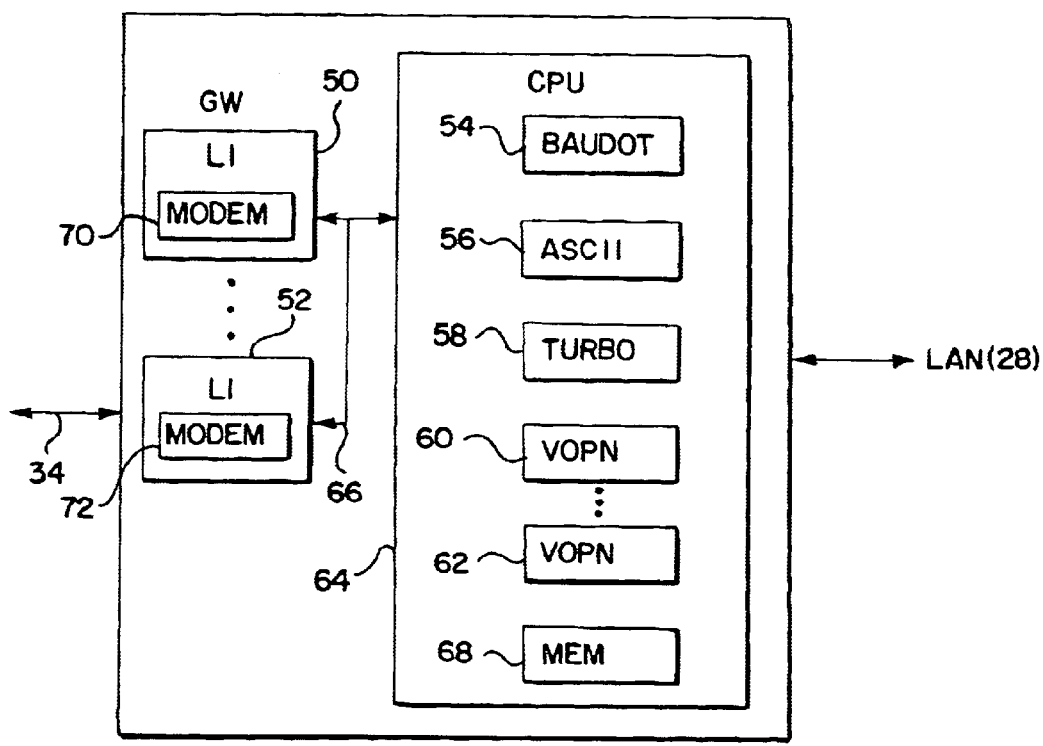
FIG. 2 depicts a gateway that may be used by the system of FIG. 1.

FIG. 2 may be used to illustrate the GW 18. The GW 18 may generally be implemented on a personal computer (PC). Included within the GW 18 may be a central processing unit (CPU) 64. The CPU 64 may, in turn, include a number of protocol conversion applications 54, 56, 58 and voice-over-packet network (VOPN) applications 60, 62.

The GW 18 may also be provided with one more line interface (LI) cards 50, 52. The LI cards 50, 52 may be any telephone interface card (e.g., made by Dialogic) capable of accepting a switched circuit connection (i.e., a telephone line 34) on a first side and capable of coupling with an internal bus 66 of the CPU on a second side.

Each LI card 50, 52 may be capable of operating in one of two modes. Under a first mode, a LI 50, 52 may exchange voice information (e.g., analog or digital) between the telephone connection 34 and a VOPN application 60, 62. The first mode may be used to handle an ordinary audio conversation between an agent 30, 32 and a third party 36 through the circuit switched PSTN 16.

In a second mode, a modem 70, 72 within the LI 50, 52 may be used to support the exchange of textual data between the telephone connection 34 and a protocol converter 54, 56, 58. The modem 70, 72 of the LI 50, 52 and protocol converter 54, 56, 58 may together be used to support a textual conversation between a terminal 22, 26 of an agent 30, 32 and a terminal 12, 14 of the hearing impaired person.

Whether an LI 50, 52 is operating under the first or second mode, information is passed between the GW 18 and agent station 30, 32 over the packet network 28 under a Transport Control Protocol/Internet Protocol (TCP/IP) format. Voice information may be passed between a packet telephone 20, 24 and a corresponding VOPN application 60, 62 as data packets using TCP/IP. Similarly textual information may be passed between a terminal 22, 26 and a corresponding protocol conversion application 54, 56, 58 as data packets using TCP/IP.

As calls arrive from the hearing impaired 12, 14, the incoming call may be detected by the CPU 64 on a corresponding LI card (e.g., LI 50). Upon answering the call, the CPU 64 (relying upon such services an automatic number identification (ANI) operating from within the circuit switched PSTN 16) may receive a telephone number of the caller. By reference to a lookup table within memory 68, the CPU 64 may identify the calling hearing impaired person 12, 14.

Also, upon answering the call, the CPU 64 may couple a modem 70 of the LI card 50 to the telephone connection 34 for purposes of detecting a connect tone from a modem 13, 15 of a hearing impaired caller. If a connect tone is detected through the modem 70, the modem 70 sends a signal to the CPU 64, notifying the CPU 64 of the connect tone. The CPU 64, in turn, couples an output of the modem 70 to a protocol converter 54, 56, 58.

Since, the CPU 64 does not a priori know the format of the incoming textual signal (e.g., Baudot, SCII, Turbocode, etc.), the CPU 64 may couple an output of the modem 70 to each protocol converter 54, 56, 58, simultaneously. The proper format (e.g., Baudot, ASCII or Turbocode) may be determined by analyzing the textual output stream of each protocol converter 54, 56, 58 for spelling and grammatical errors using an appropriate word processing application (e.g., Microsoft Word). The correct protocol may be determined by selecting the stream with the fewest number of errors.

Alternatively, the CPU 64 may simply couple the textual call to an agent terminal 22, 26. The agent may then select the most appropriate protocol by selecting the application 54, 56, 58 which gives the best result.

In either case, the CPU 64 may determine the identity of the agent 30, 32 for assignment of the textual call under any of a number of different criteria. For example, the CPU 64 may assign an agent 30, 32 based the identity of the caller. Alternatively, the CPU 64 may assign the call based upon which agent 30, 32 has been idle the longest.

To create the pathway between the protocol converter 54, 56, 58 and terminal 22, 26 of the assigned agent 30, 32, the CPU 64 may transfer an TCP/IP address of assigned terminal 22, 26 to the protocol converter 54, 56. Receipt of the TCP/IP address of the assigned terminal 22, 26 initiates the transmission of data to the terminal 22, 26 from the protocol converter 54, 56, 58. The transmission of data from the protocol converter 54, 56, 58 to the assigned terminal 22, 26 also spawns the generation of an address plug within the terminal 22, 26 for a return path to the terminal 12, 14 of the hearing impaired caller through the selected protocol converter 54, 46, 58 and modem 50.

Using the address plug, return messages may be coupled back to the selected protocol converter 54, 56, 58. From the sending protocol converter 54, 56, 58, return messages may be coupled back to the LI 50, 52 and, in turn, through the voice channel through the circuit switched PSTN 16 to the source terminal 12, 14.

Once the CPU 64 has created a connection through the packet network 28 to the terminal 22, 28 of the selected agent 30, 32, the selected agent 30, 32 may view textual messages on a display 23, 27 from the terminal 12, 14 of the hearing impaired person. Using his own keyboard 21, 25, the selected agent 30, 32 may enter his own textual messages for transmission back to the hearing impaired caller 12, 14.

Upon occasion, a request from the hearing impaired caller 12, 14 may require the selected agent 30, 32 to relay information between the hearing impaired caller 12, 14 and a third party 36. To initiate a call to the third party 36, the assigned agent 30, 32 may pick up a handset of his packet telephone 20, 24. Picking up the handset causes the packet telephone 20, 24 to send an access request packet to the CPU 64.

The CPU 64, in turn, may assign a VOPN application 60, 62 to the call. The CPU 64 may also assign an LI 50, 52 to the assigned VOPN application 60, 62 to complete a connection for the outgoing call.

Once a VOPN application 60, 62 has been assigned to the call, information may be exchanged as packetized data between the telephone 20, 24 and assigned VOPN application 60, 62. The packetized data exchanged between the packet telephone and VOPN applications 60, 62 may occur under any of a number of different formats (e.g., H.323, MGCP, SIP, etc.).

Once the setup is complete, the assigned VOPN application 60, 62 may send a line ready message back to the packet phone 20, 24. The packet telephone 20, 24 may respond by providing a dial tone to the agent. The agent may then enter the telephone number of the desired third party 36.

Entry of a telephone number causes the packet telephone 20, 24 to compose a packet message containing the telephone number back to the assigned VOPN application 60, 62. The assigned VOPN application 60, 62 transfers the telephone number to the assigned LI 50, 52. The LI 50, 52 may in turn seize a telephone line 34 and outdial the transferred telephone number.

The circuit switched PSTN 16 receives the outdialed number and in turn couples the seized line to the third party 36. The LI 50, 52, upon detecting a connection, transfers a call connect message to the assigned VOPN application 60, 62 and begins exchanging two-way audio information with the VOPN application 60, 62. The VOPN application 60, 62, in turn, packetizes the call connect message, transfers it to the packet telephone 20, 24, and begins exchanging two-way audio information for exchange with the packet telephone 20, 24.

Upon detecting the call connect message from the VOPN application, the packet telephone 20, 24 couples a microphone and speaker of the packet telephone 20, 24 to the connection with the VOPN application 60, 62. In response, the assigned agent 30, 32 hears the voice of the third party 36. The assigned agent 30, 32 may now relay messages between the calling hearing impaired terminal 12, 14 and third party 36. As the hearing impaired person types messages into his terminal 12, 14, the assigned agent may read the messages to the third party 36. As the assigned agent hears responses from the third party 36, the agent 30, 32 may type textual response to the hearing impaired third party through the agent's terminal 22, 26.

In a very similar manner, calls may be placed from a third party 36 to a hearing impaired person 12, 14. In this case, the third party 36 places a call to the relaying service 10 in a conventional manner. The call is assigned to an agent 30, 32 and the agent calls the hearing impaired person terminal 12, 14. The agent 30, 32 relays messages substantially as described above.

A specific embodiment of a method and apparatus for relaying calls of hearing impaired persons has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method for relaying text between a hearing impaired person and a non-hearing impaired third party through the public switched telephone network, such method comprising:
   converting the text between a multifrequency textual format on the public switched telephone network and a packet format on a local area network; and
   exchanging the text with the hearing impaired person through the local area network.

2. The method of relaying text as in claim 1 further comprising coupling a terminal to the local area network.

3. The method of relaying text as in claim 2 further comprising providing a packet telephone coupled to the local area network for relaying the text between the terminal and the third party under a verbal format.

4. The method of relaying text as in claim 3 further comprises assigning an agent to the telephone and terminal for converting between the textual and verbal format.

5. The method of relaying text as in claim 1 wherein the textual format of the multifrequency textual format further comprises one of Baudot, ASCII and Turbocode.

6. The method of relaying text as in claim 5 wherein the step of converting further comprises determining the textual format used by the hearing impaired person.

7. The method of relaying text as in claim 6 wherein the step of converting further comprises assigning a conversion application based upon the determined textual format.

8. An apparatus for relaying text between a hearing impaired person and a third party through the public switched telephone network, such apparatus comprising:
   means for converting the text between a multifrequency textual format on the public switched telephone network and a packet format on a local area network; and
   means for exchanging the text with the hearing impaired person through the local area network.

9. The apparatus for relaying text as in claim 8 further comprising means for coupling a terminal to the local area network.

10. The apparatus for relaying text as in claim 9 further comprising means for providing a packet telephone coupled to the local area network for relaying the text between the terminal and the third party under a verbal format.

11. The apparatus for relaying text as in claim 10 further comprises means for assigning an agent to the telephone and terminal for converting between the textual and verbal format.

12. The apparatus for relaying text as in claim 8 wherein the textual format of the multifrequency textual format further comprises one of Baudot, ASCII and Turbocode.

13. The apparatus for relaying text as in claim 12 wherein the means for converting further comprises means for determining the textual format used by the hearing impaired person.

14. An apparatus for relaying text between a hearing impaired person and a third party through the public switched telephone network, such apparatus comprising:
   a gateway for converting the text between a multifrequency textual format on the public switched telephone network and a packet format on a local area network; and
   the local area network for exchanging the text with the hearing impaired person through the local area network.

15. A device for relaying textual information between a hearing impaired person and third party through the public switched telephone network, such device comprising:
   a gateway adapted to convert between a multifrequency textual signal exchanged with the hearing impaired person through the public switched telephone network and packet based textual information on a local area network; and
   a terminal coupled to the gateway through the local area network and adapted to exchange the textual information with the hearing impaired person through the local area network.

16. The device for relaying textual information between a hearing impaired person and third party as in claim 15 wherein the gateway further comprises a modem.

17. The device for relaying textual information between a hearing impaired person and third party as in claim 15 wherein the multifrequency textual signal further comprises one of Baudot, ASCII and Turbocode.

18. The device for relaying textual information between a hearing impaired person and third party as in claim 15 further comprising a switched circuit coupling the gateway to the public switched telephone network.

19. The device for relaying textual information between a hearing impaired person and third party as in claim 15 wherein the packet format further comprises one of H.323, MGCP and SIP.

20. The device for relaying textual information between a hearing impaired person and third party as in claim 15 further comprising a packet telephone coupled to the public switched telephone network through the local area network and gateway and adapted to exchange the textual information under a verbal format between the terminal and third party.

21. The device for relaying textual information between a hearing impaired person and third party as in claim 15 further comprising a plurality of terminals for exchanging textual information with a plurality of hearing impaired persons.

22. A device for relaying textual information between a hearing impaired person and third party through the public switched telephone network, such device comprising:
- a gateway adapted to convert between the textual information exchanged through the public switched telephone network under a multifrequency format and the textual information exchanged over a local area network under a packet format; and
- a terminal coupled to the gateway through the local area network and adapted to exchange the textual information with the hearing impaired person through the local area network and gateway.

23. The device for relaying textual information between a hearing impaired person and third party as in claim 22 wherein the gateway further comprises a modem.

24. The device for relaying textual information between a hearing impaired person and third party as in claim 22 wherein the multifrequency format further comprises one of Baudot, ASCII and Turbocode.

25. The device for relaying textual information between a hearing impaired person and third party as in claim 22 further comprising a switched circuit coupling the gateway to the public switched telephone network.

26. The device for relaying textual information between a hearing impaired person and third party as in claim 25 wherein the packet format further comprises one of H.323, MGCP and SIP.

27. The device for relaying textual information between a hearing impaired person and third party as in claim 22 further comprising a packet telephone coupled to the public switched telephone network through the local area network and gateway and adapted to exchange the content of the textual information with the third party under a verbal format.

28. A device for relaying textual information between hearing impaired persons and third parties through the public switched telephone network, such device comprising:
- a gateway adapted to convert between a multifrequency textual signal exchanged with a hearing impaired person of the hearing impaired persons through the public switched telephone network and packet based textual information on a local area network; and
- a terminal coupled to the gateway through the local area network and adapted to exchange the textual information with the hearing impaired person through the local area network.

29. The device for relaying textual information between a hearing impaired person and third party as in claim 28 wherein the gateway further comprises a modem.

30. The device for relaying textual information between a hearing impaired person and third party as in claim 28 wherein the multifrequency textual signal further comprises one of Baudot, ASCII and Turbocode.

31. The device for relaying textual information between a hearing impaired person and third party as in claim 28 further comprising a switched circuit coupling the gateway to the public switched telephone network.

32. The device for relaying textual information between a hearing impaired person and third party as in claim 28 wherein the packet format further comprises one of H.323, MGCP and SIP.

33. The device for relaying textual information between a hearing impaired person and third party as in claim 28 further comprising a packet telephone coupled to the public switched telephone network through the local area network and gateway and adapted to exchange the textual information under a verbal format between the terminal and third party.

34. The device for relaying textual information between a hearing impaired person and third party as in claim 28 further comprising a plurality of terminals for exchanging textual information with a respective one of a plurality of hearing impaired persons.

* * * * *